(No Model.)
M. GOUDREAU.
CRUPPER.
No. 536,280. Patented Mar. 26, 1895.
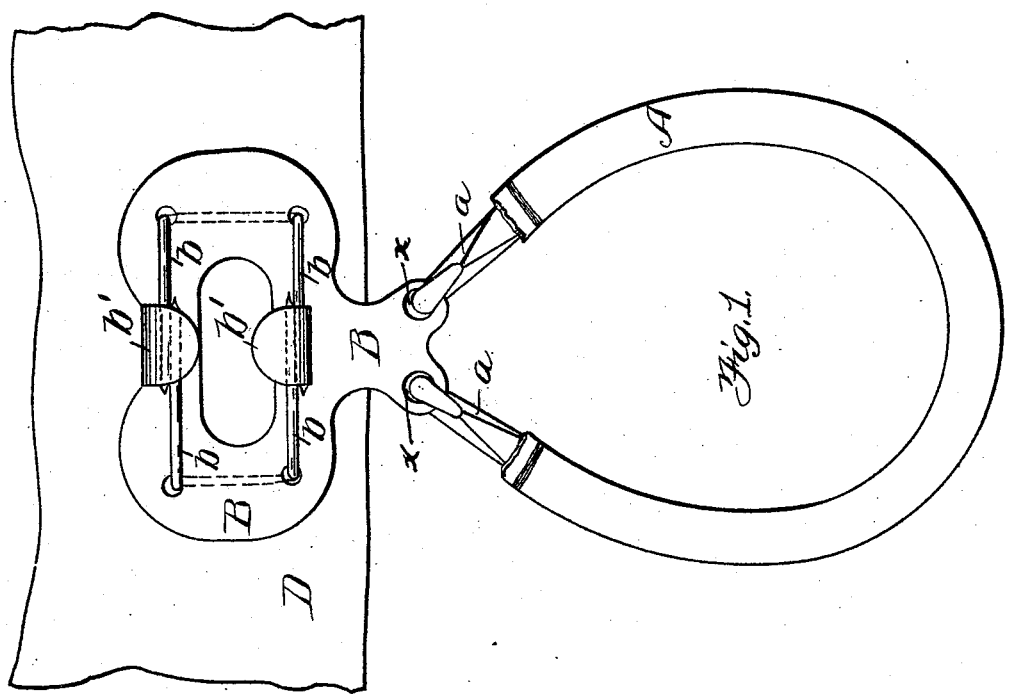
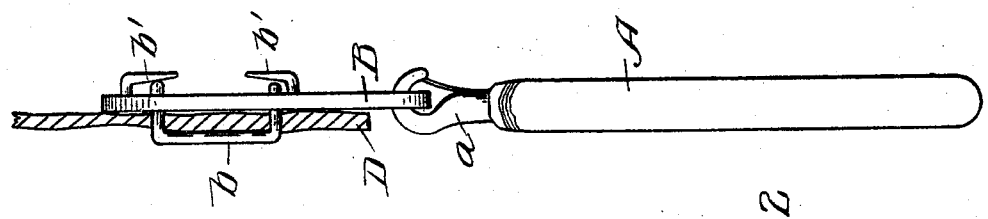
Witnesses:
J. Mathn Cullin
O. R. Mitchell.
Inventor,
Marcel Goudreau
By J. E. Maynadier
his Attorney.

UNITED STATES PATENT OFFICE.

MARCEL GOUDREAU, OF TAUNTON, MASSACHUSETTS, ASSIGNOR OF ONE-HALF TO OVIDE LAVALLEE, OF SAME PLACE.

CRUPPER.

SPECIFICATION forming part of Letters Patent No. 536,280, dated March 26, 1895.

Application filed March 8, 1894. Serial No. 502,825. (No model.)

*To all whom it may concern:*

Be it known that I, MARCEL GOUDREAU, of Taunton, in the county of Bristol and State of Massachusetts, (formerly of Ste. Angele, in the Province of Quebec and Dominion of Canada, now a subject of the Queen of Great Britain, but I am shortly to complete my naturalization papers,) have invented an Improved Crupper, of which the following is a specification, reference being had to the accompanying drawings, in which—

Figure 1 is a plan, and Fig. 2 an elevation partly in section of my improved crupper.

My invention consists in the combination of a crupper terminating in snap hooks with a plate provided with safety pins by which the plate can be detachably secured to a blanket; the plate having an extension with eyes by which the crupper is attached to the plate, so that it can be readily attached or detached.

In the drawings A is the crupper strap consisting of a piece of rubber tubing, in order that it may be elastic and soft, and a snap hook $a$ is made fast to the ends of this rubber tube A. The hooks $a$ engage with the plate B, which is provided with eyes for hooks $a$ and the plate B is provided with pins $b$ the ends of which are sprung under the ears $b'$ on plate B after the pins have been put through the blanket D.

By my new article, which I call a blanket crupper, the blanket is held in place especially on horses which are blanketed when in the stable; making the use of a surcingle unnecessary; but holding the blanket better than heretofore whether the surcingle be used or not.

The crupper A may be made of any suitable material, but I prefer the rubber tubing because it is soft and pliable and because when worn out it can be readily replaced, it being a simple matter for a stable man to take off the old piece and put on a new one.

The pins $b$ are each made of a single piece of wire sharpened at both ends, bent to form a staple, and then bent again to pass through the holes in plate B, with the legs of the staple on one side and the bar of the staple on the other side of the plate B.

What I claim as my invention is—

The new article of manufacture above described made up of plate B having eyes $x$; pins $b$ bent as shown and passing through holes in plate B; ears $b'$ on plate B to cover the points of pins $b$; and crupper A detachably secured to plate B through eyes $x$ all constructed and arranged substantially as described.

MARCEL GOUDREAU.

Witnesses:
O. R. MITCHELL,
WM. MAYNADIER.